United States Patent
Heo et al.

(10) Patent No.: US 10,812,203 B2
(45) Date of Patent: Oct. 20, 2020

(54) RECEIVED SIGNAL STRENGTH INDICATOR MEASUREMENT FOR LICENSED ASSISTED ACCESS

(71) Applicant: INTEL IP CORPORATION, Santa Clara, CA (US)

(72) Inventors: Youn Hyoung Heo, Seoul (KR); Hwan Joon Kwon, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/751,838

(22) PCT Filed: Dec. 26, 2015

(86) PCT No.: PCT/US2015/000467
§ 371 (c)(1),
(2) Date: Feb. 9, 2018

(87) PCT Pub. No.: WO2017/026984
PCT Pub. Date: Feb. 16, 2017

(65) Prior Publication Data
US 2018/0241486 A1    Aug. 23, 2018

Related U.S. Application Data

(60) Provisional application No. 62/204,929, filed on Aug. 13, 2015.

(51) Int. Cl.
*H04B 17/318*    (2015.01)
*H04W 36/24*    (2009.01)
(Continued)

(52) U.S. Cl.
CPC ......... *H04B 17/318* (2015.01); *H04L 5/0048* (2013.01); *H04W 16/14* (2013.01); *H04W 24/10* (2013.01); *H04W 36/24* (2013.01)

(58) Field of Classification Search
CPC .... H04B 17/318; H04L 5/0048; H04W 16/14; H04W 24/10; H04W 36/24
See application file for complete search history.

(56) References Cited

U.S. PATENT DOCUMENTS

2011/0007657 A1*    1/2011    Kazmi ................ H04J 11/0093
                                                       370/252
2012/0264441 A1*    10/2012   Chandrasekhar ..... H04L 5/0096
                                                       455/450
(Continued)

OTHER PUBLICATIONS

U.S. Appl. No. 62/146,107, Novlan, filed Apr. 10, 2015 (Year: 2015).*

(Continued)

*Primary Examiner* — Jay L Vogel
(74) *Attorney, Agent, or Firm* — Eschweiler & Potashnik, LLC

(57) ABSTRACT

In a Long-Term Evolution Licensed Assisted Access (LTE-LAA) environment, Received Signal Strength Indicator (RSSI) measurements may be taken by a User Equipment (UE) outside of transmission bursts of cells in the LTE-LAA environment. For example, a serving cell may indicate transmission burst timing, of the serving cell, via Radio Resource Control (RRC) signaling. Non-serving cells may align transmission burst timing with the outputting of a Discovery Reference Signal (DRS). The serving cell may provide DRS configuration information, which may indicate the timing of the DRS of the non-serving cells. The UE may use the DRS configuration information to measure the RSSI of the non-serving cells outside of their transmission bursts.

13 Claims, 7 Drawing Sheets

(51) Int. Cl.
*H04W 24/10* (2009.01)
*H04L 5/00* (2006.01)
*H04W 16/14* (2009.01)

(56) References Cited

U.S. PATENT DOCUMENTS

| | | |
|---|---|---|
| 2014/0146691 A1 | 5/2014 | Soliman |
| 2014/0200001 A1* | 7/2014 | Song ................. H04W 36/0094 455/436 |
| 2015/0092582 A1* | 4/2015 | Liao ....................... H04J 11/005 370/252 |
| 2015/0139113 A1 | 5/2015 | You et al. |
| 2015/0223149 A1 | 8/2015 | Liu et al. |
| 2016/0183204 A1* | 6/2016 | Seo ....................... H04L 5/0048 455/127.2 |
| 2016/0302230 A1* | 10/2016 | Novlan ................ H04B 17/318 |
| 2016/0338118 A1* | 11/2016 | Vajapeyam .......... H04B 17/318 |
| 2017/0142746 A1* | 5/2017 | Koorapaty ............ H04W 16/14 |
| 2018/0213386 A1* | 7/2018 | Kim .................... H04J 11/0073 |

OTHER PUBLICATIONS

U.S. Appl. No. 62/134,371, Koorapaty, filed Mar. 17, 2015 (Year: 205).*
U.S. Appl. No. 62/161,167 (Year: 2015).*
U.S. Appl. No. 62/190,740 (Year: 205).*
International Search Report and Written Opinion for PCT/US2015/000467 dated Apr. 21, 2016.
"3rd Generation Partnership Project; Technical Specification Group Radio Access Network; Study on Licensed-Assisted Access to Unlicensed Spectrum; (Release 13)", 3GPP DRAFT 36889, Jun. 2015 (available at http://www.3gpp.org/ftp/tsg_ran/WG1_RL1/DRAFT/).
Intel Corporation, "RRM enhancements for LAA", 3GPP DRAFT R1-150505, Feb. 2015 (available at http://www.3gpp.org/ftp/Meetings_3GPP_SYNC/RAN1/Docs/).
NTT DOCOMO, "Views on Discovery Signal-Based RSRQ Measurement", 3GPP Draft R1-143217, Aug. 2014 (available at http://www.3gpp.org/ftp/Meetings_3GPP_SYNC/RAN1/Docs/).

* cited by examiner

RECEIVED SIGNAL STRENGTH INDICATOR MEASUREMENT FOR LICENSED ASSISTED ACCESS

RELATED APPLICATIONS

The present application claims the benefit of U.S. Provisional Patent Application No. 62/204,929, which was filed on Aug. 13, 2015; and of PCT/US2015/000467, filed on Dec. 26, 2015, the contents of which are hereby incorporated by reference as though fully set forth herein.

BACKGROUND

The demand for wireless broadband data has consistently increased. Unlicensed spectrum (i.e., frequency spectrum that does not require a license from an appropriate regulating entity) is being considered by wireless cellular network operators to increase the capacity of existing services that are offered over licensed spectrum.

The use of unlicensed spectrum in the Third Generation Partnership Project (3GPP) Long Term Evolution-Advanced (LTE-A) system has been proposed as Licensed Assisted Access (LAA). Under LAA, the LTE standard is extended into unlicensed frequency deployments, thus enabling operators and vendors to maximally leverage the existing or planned investments in LTE hardware in the radio and core network.

In LTE, received signal strength indicator (RSSI) may be used in determining which cell a user equipment (UE) should attach to. As defined in 3GPP TS 36.214, RSSI may be part of Reference Signal Received Quality (RSRQ) measurement (where RSRQ is the ratio N×RSRP/(E-UTRA carrier RSSI)), although RSSI itself is not reported to the network. RSSI includes the linear average of the total received power (in Watts), observed in certain orthogonal frequency division multiplexing (OFDM) symbols of measurement subframes, in the measurement bandwidth, over N number of resource blocks by the UE from all sources, including co-channel serving and non-serving cells, adjacent channel interference, thermal noise etc.

Existing RSSI measurement definitions do not typically provide useful interference information from a non-serving cell (e.g., a node to which a UE is not attached). Specifically, for instance, factors that contribute to the received signal can be significantly different depending on when the signal is measured. For example, if RSSI is measured during an LAA transmission burst, the main portion of the measured RSSI is the signal from the serving evolved NodeB (eNB), because the eNB sends a downlink (DL) signal during the transmission burst. On the other hand, if RSSI is measured outside of a transmission burst, the main portion of the measured RSSI would be interference. If the UE averages the measured RSSI measurements over a long period of time, such measurements would not necessarily provide meaningful information, because the measured RSSI includes both "desired" signal (e.g., actual traffic, such as user plane traffic from the eNB) and "undesired" signal (e.g., interference). That is, the RSSI value, averaged over time, may be quite different depending on whether "desired" signal has been included in RSSI measurements or not.

BRIEF DESCRIPTION OF THE DRAWINGS

Embodiments will be readily understood by the following detailed description in conjunction with the accompanying drawings. To facilitate this description, like reference numerals may designate like structural elements. Embodiments are illustrated by way of example and not by way of limitation in the figures of the accompanying drawings.

DETAILED DESCRIPTION OF PREFERRED EMBODIMENTS

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope described herein is defined by the appended claims and their equivalents.

In LTE-LAA, an eNB may cause a UE to attach to a particular cell, out of a group of available cells (e.g., primary cells (PCells) or secondary cells (SCells)). In some situations, a UE may be in range of a serving cell (e.g., a cell that is associated with an eNB to which a particular UE is connected), and one or more non-serving cells (e.g., a cell that is associated with an eNB to which the particular UE is not configured). Non-serving cells may further be cells to which the UE is not attached, and therefore does not receive control information (e.g., information that indicates transmission burst timing of the non-serving cells).

In order to make decisions regarding whether the UE should connect to a particular cell (including a non-serving cell), the eNB may rely on signal and/or interference measurements, such as RSSI measurements. Additionally, in a listen before talk (LBT) scenario, a serving eNB may prefer to select a channel that has a greater amount of time where the RSSI of non-serving nodes is relatively low (e.g., below a clear channel assessment (CCA) threshold).

Various embodiments are described herein, in which RSSI information may be measured, by a UE, outside of a transmission burst of a serving cell, and/or outside of a transmission burst of one or more non-serving cells. In some implementations, Discovery Reference Signal (DRS) timing information may be used by a UE in determining an RSSI of the non-serving cell. For instance, the UE may determine the RSSI of the non-serving cell outside of a DRS occasion associated with the non-serving cell. The RSSI information may be used in order to perform one or more processes in accordance with LTE-LAA techniques (e.g., cell selection and/or channel selection).

Figure 1:
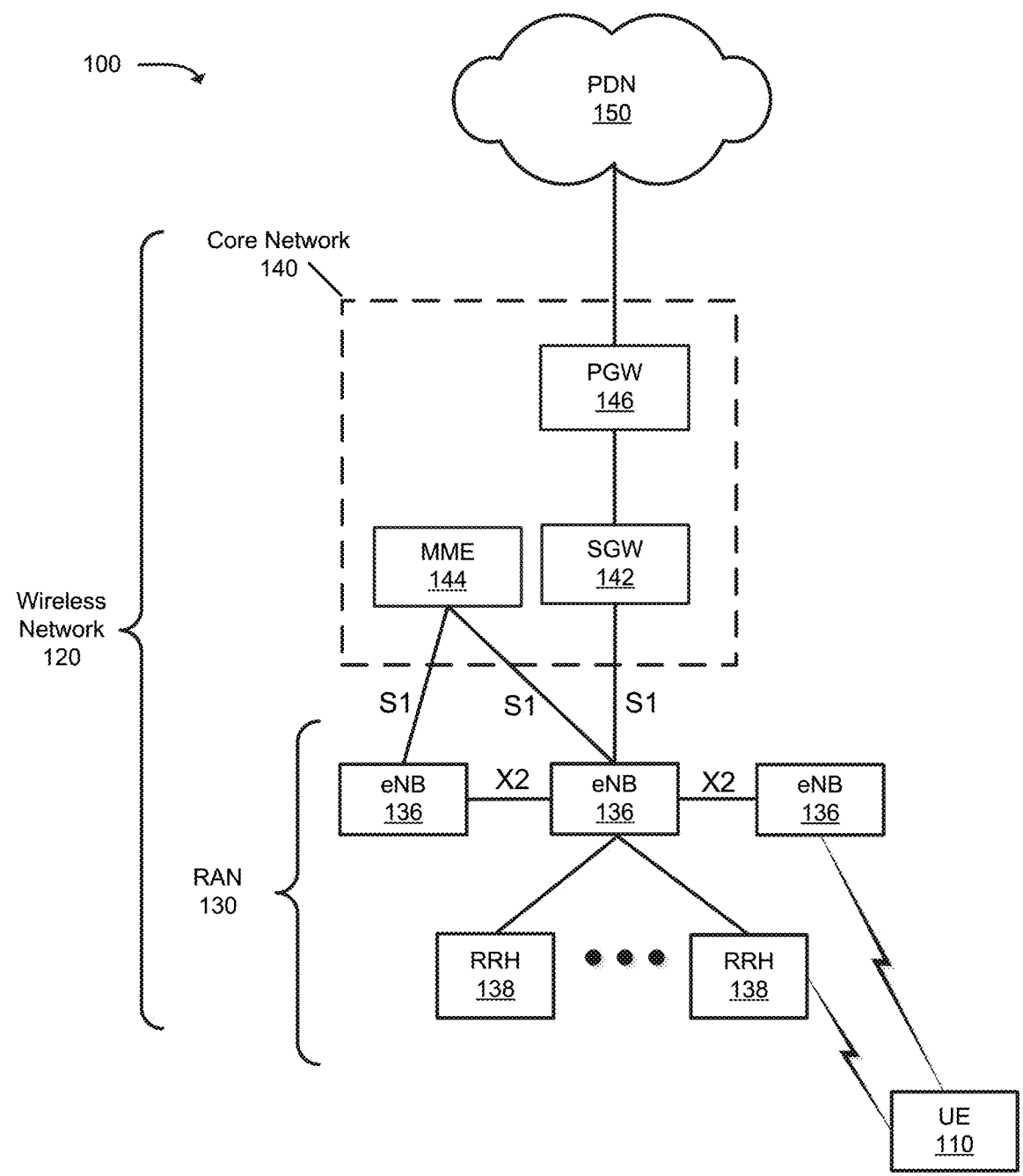
FIG. 1 is a diagram of an example environment in which systems and/or methods described herein may be implemented.

FIG. 1 is a diagram of an example environment 100, in which systems and/or methods described herein may be implemented. As illustrated, environment 100 may include UE 110, which may obtain network connectivity from wireless network 120. Although a single UE 110 is shown, for simplicity, in FIG. 1, in practice, multiple UEs 110 may operate in the context of a wireless network. Wireless network 120 may provide access to one or more external networks, such as packet data network (PDN) 150. The wireless network may include radio access network (RAN) 130 and core network 140. RAN 130 may be an evolved Universal Mobile Telecommunications System (UMTS) Terrestrial Radio Access (E-UTRA) based network or another type of RAN. Some or all of RAN 130 may be associated with a network operator that controls or otherwise manages core network 140. Core network 140 may include an Internet Protocol (IP)-based network.

UE 110 may include a portable computing and communication device, such as a personal digital assistant (PDA), a smart phone, a cellular phone, a laptop computer with connectivity to a cellular wireless network, a tablet computer, etc. UE 110 may also include non-portable computing devices, such as desktop computers, consumer or business appliances, or other devices that have the ability to wirelessly connect to RAN 130.

UEs 110 may be designed to operate using LTE-LAA. For instance, UEs 110 may include radio circuitry that is capable of simultaneously receiving multiple carriers: a first, primary, carrier using licensed spectrum and a second carrier using unlicensed spectrum. The second carrier may correspond to, for example, the unlicensed 5 GHz spectrum. This spectrum may commonly be used by WiFi devices. A goal of LTE-LAA may be to not impact WiFi services more than an additional WiFi network on the same carrier.

UEs 110 capable of operating on the unlicensed band may be configured to make measurements to support unlicensed band operation, including providing feedback when the UE is in the coverage area of an LTE-LAA node. For example, UE 110 may measure RSSI of an LTE-LAA node and/or one or more other nodes (e.g., an RSSI associated with one or more eNBs 136), and report the RSSI measurements to a serving eNB 136. In accordance with some implementations described herein, UE 110 may measure the RSSI outside of a transmission burst, in order to more consistently determine interference values.

RAN 130 may represent a 3GPP access network that includes one or more RATs. RAN 130 may particularly include multiple base stations, referred to as eNBs 136. eNBs 136 may include eNBs that provide coverage to a relatively large (macro cell) area or a relatively small (small cell) area. Small cells may be deployed to increase system capacity by including a coverage area within a macro cell. Small cells may include picocells, femtocells, and/or home NodeBs. Small cells may, in some situations, be operated as SCells, in which the macro cell (the PCell) may be used to exchange important control information and provide robust data coverage and the SCell may be used as a secondary communication channel, such as to offload downlink data transmissions. eNBs 136 can potentially include remote radio heads (RRH), such as RRHs 138. RRHs 138 can extend the coverage of an eNB by distributing the antenna system of the eNB. RRHs 138 may be connected to eNB 136 by optical fiber (or by another low-latency connection).

In the discussion herein, an LTE-LAA node may correspond to eNB 136 (small cell or macro cell) or RRH 138. The LTE-LAA node may also be referred to as an "LTE-LAA transmission point," "LTE-LAA transmitter," "LAA node," or "LAA eNB." For simplicity, eNB 136 will be discussed herein as corresponding to an eNB that uses a licensed frequency. In some implementations, eNB 136 may include, or be in communication with, an LTE-LAA node (e.g., an LTE-LAA node that uses an unlicensed frequency). In some implementations, an LTE-LAA node may be co-located with a corresponding eNB 136 that uses licensed frequency. The licensed frequency eNBs 136 and the LTE-LAA node may maximize downlink bandwidth by performing carrier aggregation of the licensed and unlicensed bands.

Core network 140 may include an IP-based network. In the 3GPP network architecture, core network 140 may include an Evolved Packet Core (EPC). As illustrated, core network 140 may include serving gateway (SGW) 142, Mobility Management Entity (MME) 144, and packet data network gateway (PGW) 146. Although certain network devices are illustrated in environment 100 as being part of RAN 130 and core network 140, whether a network device is labeled as being in the "RAN" or the "core network" of environment 100 may be an arbitrary decision that may not affect the operation of wireless network 120.

SGW 142 may include one or more network devices that aggregate traffic received from one or more eNBs 136. SGW 142 may generally handle user (data) plane traffic. MME 144 may include one or more computation and communication devices that perform operations to register UE 110 with core network 140, establish bearer channels associated with a session with UE 110, hand off UE 110 from one eNB to another, and/or perform other operations. MME 144 may generally handle control plane traffic.

PGW 146 may include one or more devices that act as the point of interconnect between core network 140 and external IP networks, such as PDN 150, and/or operator IP services. PGW 146 may route packets to and from the access networks, and the external IP networks.

PDN 150 may include one or more packet-based networks. PDN 150 may include one or more external networks, such as a public network (e.g., the Internet) or proprietary networks that provide services that are provided by the operator of core network 140 (e.g., IP multimedia (IMS)-based services, transparent end-to-end packet-switched streaming services (PSSs), or other services).

A number of interfaces are illustrated in FIG. 1. An interface may refer to a physical or logical connection between devices in environment 100. The illustrated interfaces may be 3GPP standardized interfaces. For example, as illustrated, communication eNBs 136 may communicate with SGW 142 and MME 144 using the Si interface (e.g., as defined by the 3GPP standards). eNBs 136 may communicate with one another via the X2 interface.

The quantity of devices and/or networks, illustrated in FIG. 1, is provided for explanatory purposes only. In practice, there may be additional devices and/or networks; fewer devices and/or networks; different devices and/or networks; or differently arranged devices and/or networks than illustrated in FIG. 1. Alternatively, or additionally, one or more of the devices of environment 100 may perform one or more functions described as being performed by another one or more of the devices of environment 100. Furthermore, while "direct" connections are shown in FIG. 1, these connections should be interpreted as logical communication pathways, and in practice, one or more intervening devices (e.g., routers, gateways, modems, switches, hubs, etc.) may be present.

Figure 2:
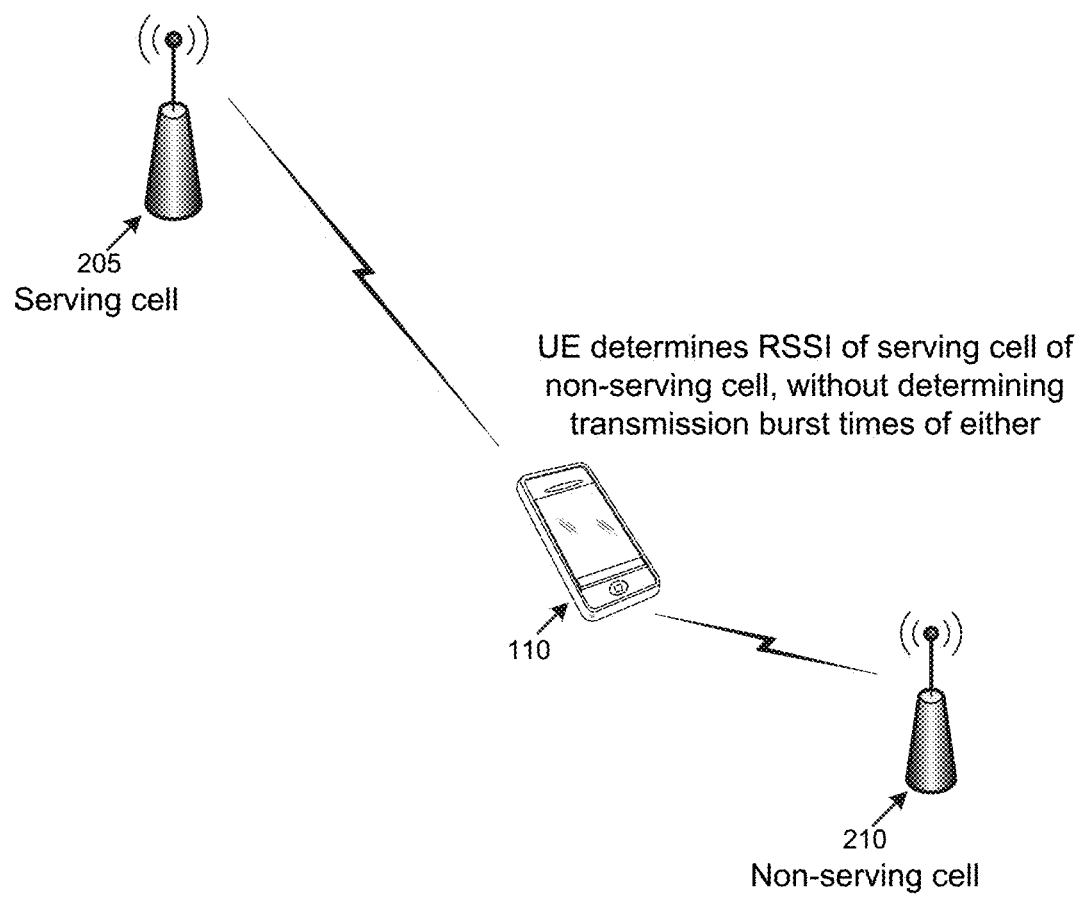
FIGS. 2 and 3 conceptually illustrate a situation in which RSSI values may be skewed for a serving cell and a non-serving cell.

FIG. 2 illustrates an example situation, in which RSSI information may be assessed in a conventional manner. For instance, UE 110 may be attached to serving cell 205 (which may be, for example, associated with an eNB 136). UE 110 may also be in range of non-serving cell 210, which may be, for instance, an SCell in an LTE-LAA environment. UE 110 may not be connected to non-serving cell 210, in the sense that UE 110 may not receive control information from non-serving cell 210 (e.g., may not have established a control channel with non-serving cell 210).

UE 110 may measure an RSSI of serving cell 205 and/or non-serving cell 215. In conventional techniques, UE 110 measures the RSSI at times that are independent of a transmission burst of serving cell 205 and/or non-serving cell 215. That is, UE 110 may measure the RSSI in a manner that is not necessarily dependent on determining when the transmission bursts, of serving cell 205 and/or non-serving cell 215, occur. For instance, since UE 110 is not connected to non-serving cell 210, and thus does not receive control information from non-serving cell 210, UE 110 may be unable to determine the timing information relating to transmission bursts from non-serving cell 210. Thus, when determining an RSSI of non-serving cell 210, UE 110 may sometimes determine the RSSI, of serving cell 205 and/or non-serving cell 210, during a transmission burst, while sometimes determining the RSSI outside of the transmission burst.

Figure 3:
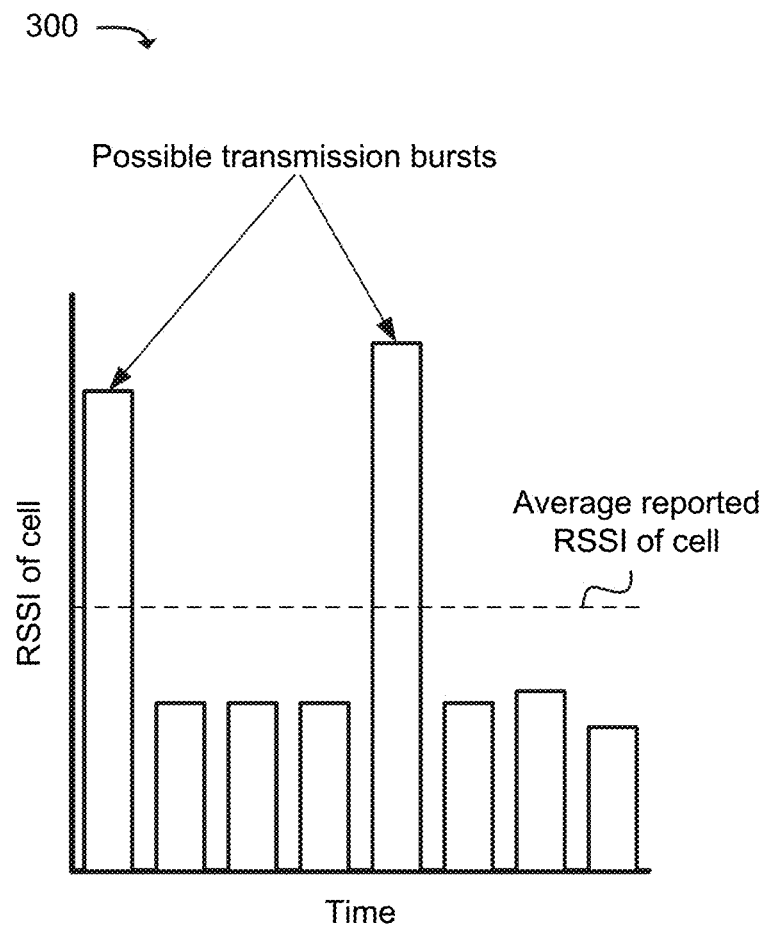

FIG. 3 conceptually illustrates one potential issue with determining the RSSI of a cell (e.g., serving cell 205 and/or non-serving cell 210), without necessarily accounting for transmission bursts. For example, graph 300 illustrates the measured RSSI of a cell (e.g., serving cell 205 and/or non-serving cell 210) at eight different times. Two of the measurements may be considerably higher (e.g., indicate a higher signal strength) than the other six measurements, thus yielding an average RSSI that is higher than the other six measurements. The two higher measurements may correspond to transmission bursts, while the other six measurements may correspond to RSSI readings taken outside of the transmission bursts. Thus, the average RSSI values may be based on RSSI measurements taken both during and outside of transmission bursts, which may be not necessarily be useful in an LTE-LAA implementation. Such measurements may not be useful, as they rely on variables that are outside of actual signal strength (e.g., the RSSI readings may be skewed by whether the readings are taken during a transmission burst or not).

Figure 4:
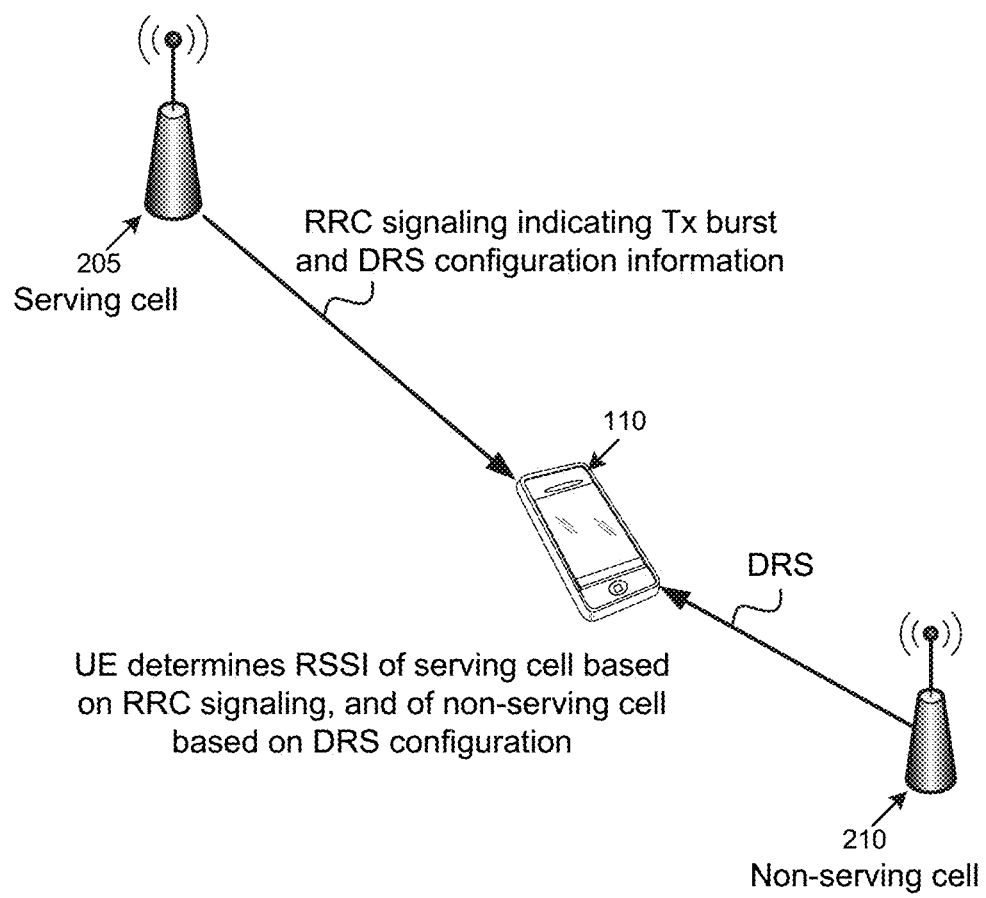
FIG. 4 conceptually illustrates an example overview of RSSI measurement of a non-serving cell based on discovery reference signals sent by the non-serving cell.

FIG. 4 conceptually illustrates an example implementation, in which UE 110 is able to determine a more meaningful RSSI value for non-serving cell 210. For instance, as shown, and in accordance with some LTE-LAA techniques, serving cell 205 may output control signaling, such as Radio Resource Control (RRC) information, which may include DRS configuration information. The RRC information may include timing information regarding transmission bursts from serving cell 205. The DRS configuration information may conventionally be used in the discovery of non-serving cell 210. The DRS configuration information may include an indication of the periodicity of a DRS outputted from non-serving cell 210 (e.g., how often non-serving cell 210 transmits the DRS, such as every 40 milliseconds), and a duration of the DRS (e.g., a quantity of subframes and/or some other measure of time that indicates how long the DRS is).

In some implementations, the DRS, outputted by non-serving cell 210, may be aligned with a transmission burst of non-serving cell 210. For instance, in some implementations, the transmission burst may begin at the start of the DRS, and may last for a particular duration (e.g., the same duration of the DRS, or a particular duration longer than the DRS).

Thus, by measuring the RSSI of serving cell 205 based on the RRC signaling information (e.g., outside of the transmission burst of serving cell 205, as indicated by the RRC signaling information), UE 110 may obtain RSSI measurements, of serving cell 205, that are not skewed by the transmission bursts of serving cell 205. Further, by measuring the RSSI of non-serving cell 210 on a timing basis that is based on the DRS configuration (e.g., which may indicate the periodicity and duration of the DRS outputted from non-serving cell 210), UE 110 may effectively measure the RSSI outside of the transmission burst of non-serving cell 210, thereby providing useful RSSI information regarding non-serving cell 210.

Figure 5:
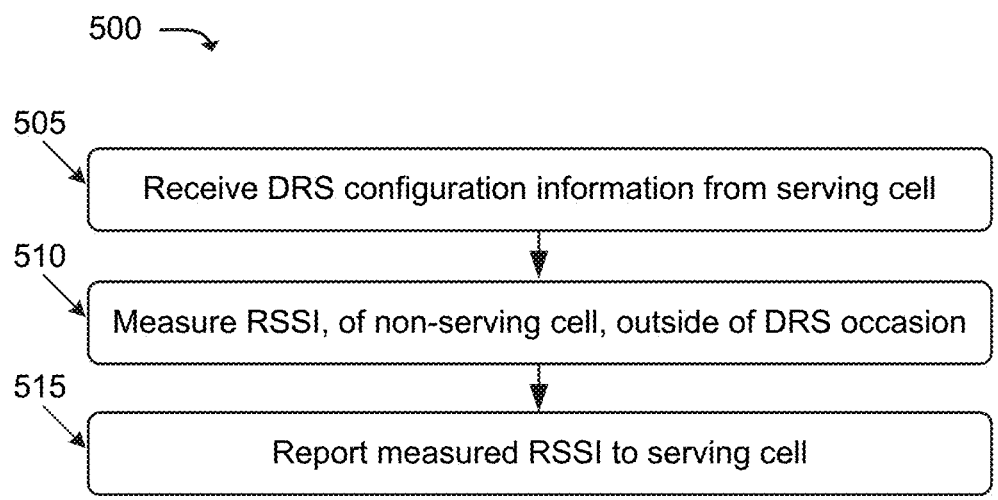
FIG. 5 illustrates an example process for obtaining an RSSI measurement of a non-serving cell, based on discovery reference signals sent by the non-serving cell.

FIG. 5 illustrates an example process 500 for measuring an RSSI of a non-serving cell, on a basis that is aligned with transmission burst timing of the non-serving cell. In some implementations, process 500 may be performed by UE 110.

As shown, process 500 may include receiving (at 505) DRS configuration information from the serving cell (e.g., serving cell 205). For example, serving cell 205 (or, more specifically, an eNB 136 associated with serving cell 205) may be configured to output DRS configuration information, which may aid UE 110 in discovering (and potentially subsequently attaching to) non-serving cell 210.

The DRS configuration information may indicate a DRS periodicity and duration. Based on the periodicity and/or duration, UE 110 may determine a DRS occasion of the DRS configuration. The DRS "occasion" may be, for example, a duration of time that occurs on the same period as the DRS configuration information, and may be the same duration of the DRS configuration information.

Process 500 may include measuring (at 510) an RSSI of the non-serving cell outside of the DRS occasion of the non-serving cell. For instance, as mentioned above, the transmission burst of non-serving cell 210 may generally be aligned with the DRS occasion of non-serving cell 210 (e.g., may occur during the DRS occasion, during a portion of the DRS occasion, or an amount of time that extends beyond the DRS occasion). By measuring the RSSI of non-serving cell 210 outside of the DRS occasion, UE 110 may reliably measure the RSSI of non-serving cell 210 outside of the transmission burst of non-serving cell 210.

In some implementations, UE 110 may be configured to measure the RSSI of non-serving cell outside of the DRS occasion, plus an additional amount of time. For instance, assume that the DRS periodicity is 40 milliseconds, and the DRS duration is 1 millisecond (thus, the DRS occasion occurs for 1 millisecond every 40 milliseconds). In this example, and in accordance with some implementations, UE 110 may be configured to measure the RSSI between the 31st and 40th millisecond of every 40 millisecond period (i.e., outside of: [Occ+Tx], where Occ is the DRS occasion, and where Tx is an additional duration of time, which is 30 milliseconds in this example). In some implementations, serving cell 205 may provide such configuration information (e.g., a value of Tx) to UE 110 via RRC signaling.

Process 500 may include reporting (at 515) the measured RSSI to a serving cell. For example, UE 110 may report the RSSI to serving cell 205, which may be associated with an eNB 136, to which UE 110 is attached. In some implementations, UE 110 may report an average RSSI, of non-serving cell 210, to serving cell 205 (e.g., an average of measured RSSI values, measured outside of multiple DRS occasions over time). In some implementations, UE 110 may report individual RSSI values to serving cell 205. That is, for instance, UE 110 may report multiple RSSI values, each being measured outside of a particular DRS occasion. In some implementations, UE 110 may also measure the RSSI of serving cell 205 and/or non-serving cell 210 in a conventional manner (e.g., without aligning RSSI measurements with DRS occasions of non-serving cell 210), and may further report these "conventional" RSSI values along with RSSI values measured according to the DRS occasions, as described herein.

In some implementations, UE 110 may measure the RSSI of serving cell 205 and/or non-serving cell 210 during a transmission burst of serving cell 205 and/or non-serving cell 210 (e.g., during the DRS occasion of non-serving cell 210), respectively. In some implementations, these RSSI measurements (i.e., during the transmission burst and/or DRS occasions), may be used for Reference Signal Receive Quality (RSRQ) reporting to serving cell 205.

Figure 6:
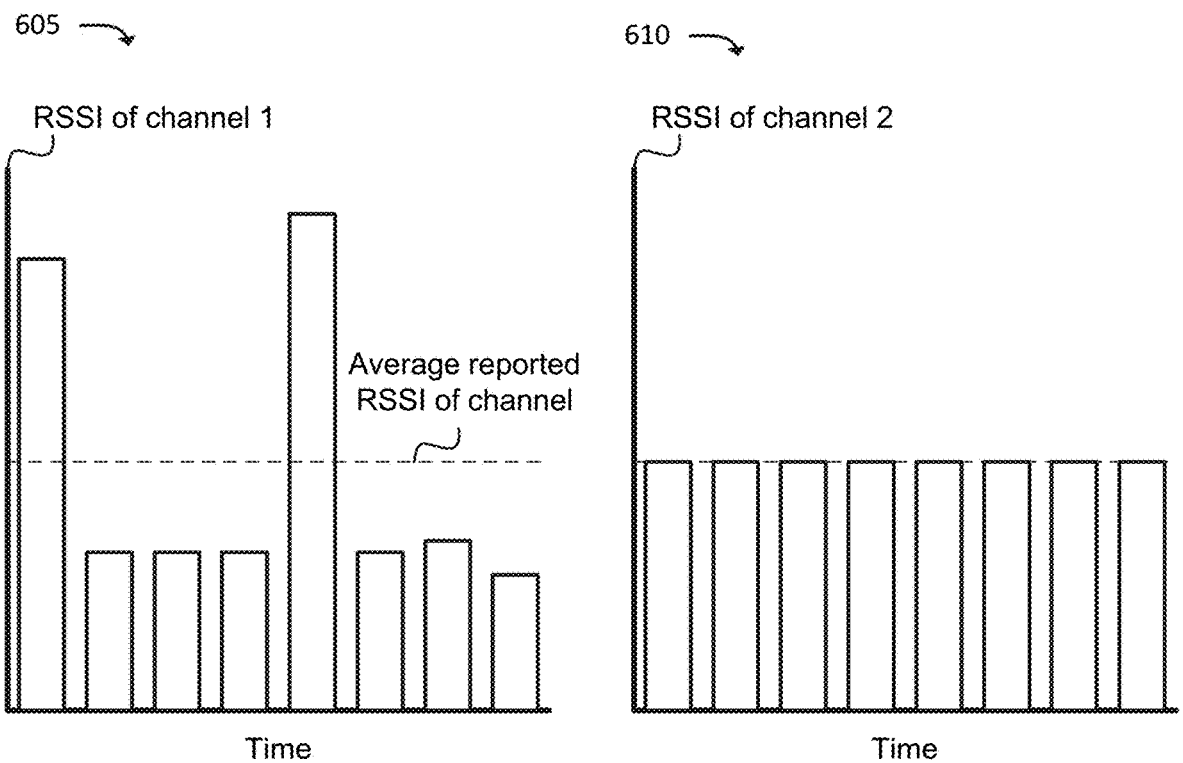
FIG. 6 shows an example of how measurements of different levels of interference may be used in selecting a channel for LAA operation.

FIG. 6 conceptually illustrates two graphs of RSSIs of two different channels (e.g., two different channels (e.g., where a particular channel corresponds to a particular frequency band or sub-band) associated with serving cell 205 and/or non-serving cell 210). For example, graph 605 may illustrate RSSI measurement values, over a given period of time, associated with a first channel ("channel 1"), while graph 610 may illustrate RSSI measurement values, over the same period of time, associated with a second channel ("channel 2"). As shown, the average RSSI measurements of both may be the same (as indicated by the dashed line). However, as also shown, channel 1 may be associated with a more varied RSSI (i.e., high RSSI at some times, with a lower RSSI at other times), while channel 2 may have a steady RSSI. In some implementations, the information regarding the variance of the RSSI may be useful in LTE-LAA. For example, serving cell 205 may select channel 1 for LTE-LAA attachment, as channel 1 may afford a greater opportunity for LBT techniques.

In some implementations, serving cell 205 may calculate a ratio or proportion that is based on a duration that the RSSI exceeds a CCA threshold, and may use the calculated ratio in selecting a channel. For example, a ratio of 1:1, for a particular channel, may indicate that the RSSI, of the particular cell, exceeds the CCA threshold one half of the time, and does not exceed the CCA threshold the other half of the time. In some implementations, this ratio may play a role in the selection of a channel.

As used herein, the term "circuitry" or "processing circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 7:
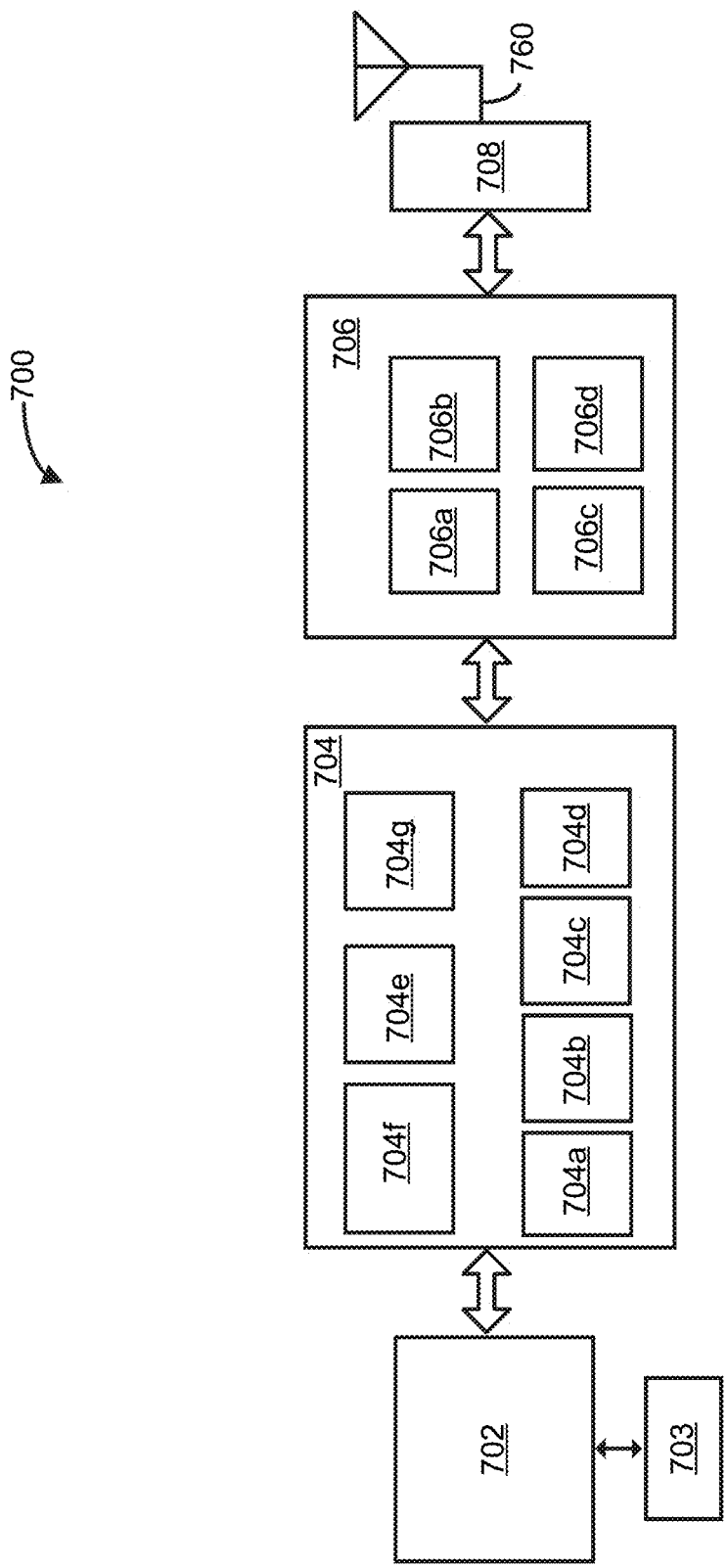
FIG. 7 illustrates example components of an electronic device.

Embodiments described herein may be implemented into a system using any suitably configured hardware and/or software. FIG. 7 illustrates, for one embodiment, example components of an electronic device 700. In embodiments, the electronic device 700 may be a user equipment UE, an eNB, a transmission point, or some other appropriate electronic device. In some embodiments, the electronic device 700 may include application circuitry 702, baseband circuitry 704, Radio Frequency (RF) circuitry 706, front-end module (FEM) circuitry 708 and one or more antennas 760, coupled together at least as shown.

Application circuitry 702 may include one or more application processors. For example, application circuitry 702 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage, such as storage medium 703, and may be configured to execute instructions stored in the memory/storage to enable various applications and/or operating systems to run on the system. In some implementations, storage medium 703 may include a non-transitory computer-readable medium. Application circuitry 702 may, in some embodiments, connect to or include one or more sensors, such as environmental sensors, cameras, etc.

Baseband circuitry 704 may include circuitry such as, but not limited to, one or more single-core or multi-core processors. The baseband circuitry 704 may include one or more baseband processors and/or control logic to process baseband signals received from a receive signal path of the RF circuitry 706 and to generate baseband signals for a transmit signal path of the RF circuitry 706. Baseband processing circuitry 704 may interface with the application circuitry 702 for generation and processing of the baseband signals and for controlling operations of the RF circuitry 706. For example, in some embodiments, the baseband circuitry 704 may include a second generation (2G) baseband processor 704a, third generation (3G) baseband processor 704b, fourth generation (4G) baseband processor 704c, and/or other baseband processor(s) 704d for other existing generations, generations in development or to be developed in the future (e.g., fifth generation (5G), sixth generation (6G), etc.). The baseband circuitry 704 (e.g., one or more of baseband processors 704a-d) may handle various radio control functions that enable communication with one or more radio networks via the RF circuitry 706. The radio control functions may include, but are not limited to, signal modulation/demodulation, encoding/decoding, radio frequency shifting, etc. In some implementations, baseband circuitry 604 may be associated with storage medium 703 or with another storage medium.

In embodiments where the electronic device 704 is implemented in, incorporates, or is otherwise part of an LTE-LAA transmission point, the baseband circuitry 104 may be to: identify one or more parameters related to the LTE-LAA transmission point, wherein the LTE-LAA transmission point is in a network that includes a plurality of LTE-LAA transmission points, respective LTE-LAA transmission points having respective parameters; and identify, based on a listen-before-talk (LBT) procedure related to identification of channel occupancy status of respective LTE-LAA transmission points in the plurality of LTE-LAA transmission points that the LTE-LAA transmission point has an unoccupied channel. RF circuitry 706 may be to transmit a signal based on the identification.

In some embodiments, modulation/demodulation circuitry of the baseband circuitry 704 may include Fast-Fourier Transform (FFT), precoding, and/or constellation mapping/demapping functionality. In some embodiments, encoding/decoding circuitry of the baseband circuitry 704 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments. In some embodiments, the baseband circuitry 704 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 704e of the baseband circuitry 704 may be configured to run elements of the protocol stack for signaling of the PHY, MAC, RLC, PDCP and/or RRC layers. In some embodiments, the baseband circuitry may include one or more audio digital signal processor(s) (DSP) 704f. The audio DSP(s) 704f may be include elements for compression/decompression and echo cancellation and may include other suitable processing elements in other embodiments.

Baseband circuitry 704 may further include memory/storage 704g. The memory/storage 704g may be used to load and store data and/or processor-executable instructions for operations performed by the processors of the baseband circuitry 704. Memory/storage 704g may particularly include a non-transitory memory. Memory/storage 704g, in one embodiment, may include any combination of suitable volatile memory and/or non-volatile memory. Memory/storage 704g may include any combination of various levels of memory/storage including, but not limited to, read-only memory (ROM) having embedded software instructions (e.g., firmware), random access memory (e.g., dynamic random access memory (DRAM)), cache, buffers, etc. Memory/storage 704g may be shared among the various processors or dedicated to particular processors.

Components of the baseband circuitry may be suitably combined in a single chip, a single chipset, or disposed on a same circuit board in some embodiments. In some embodiments, some or all of the constituent components of the baseband circuitry 704 and the application circuitry 702 may be implemented together such as, for example, on a system on a chip (SOC).

In some embodiments, the baseband circuitry 704 may provide for communication compatible with one or more radio technologies. For example, in some embodiments, the baseband circuitry 704 may support communication with an evolved universal terrestrial radio access network (EU-TRAN) and/or other wireless metropolitan area networks (WMAN), a wireless local area network (WLAN), a wireless personal area network (WPAN). Embodiments in which the baseband circuitry 704 is configured to support radio communications of more than one wireless protocol may be referred to as multi-mode baseband circuitry.

RF circuitry 706 may enable communication with wireless networks using modulated electromagnetic radiation through a non-solid medium. In various embodiments, the RF circuitry 706 may include switches, filters, amplifiers, etc. to facilitate the communication with the wireless network. RF circuitry 706 may include a receive signal path which may include circuitry to down-convert RF signals received from the FEM circuitry 708 and provide baseband signals to the baseband circuitry 704. RF circuitry 706 may also include a transmit signal path which may include circuitry to up-convert baseband signals provided by the baseband circuitry 704 and provide RF output signals to the FEM circuitry 708 for transmission.

In some embodiments, the RF circuitry 706 may include a receive signal path and a transmit signal path. The receive signal path of the RF circuitry 706 may include mixer circuitry 706a, amplifier circuitry 706b and filter circuitry 706c. The transmit signal path of the RF circuitry 706 may include filter circuitry 706c and mixer circuitry 706a. RF circuitry 706 may also include synthesizer circuitry 706d for synthesizing a frequency for use by the mixer circuitry 706a of the receive signal path and the transmit signal path. In some embodiments, the mixer circuitry 706a of the receive signal path may be configured to down-convert RF signals received from the FEM circuitry 708 based on the synthesized frequency provided by synthesizer circuitry 706d. The amplifier circuitry 706b may be configured to amplify the down-converted signals and the filter circuitry 706c may be a low-pass filter (LPF) or band-pass filter (BPF) configured to remove unwanted signals from the down-converted signals to generate output baseband signals.

Output baseband signals may be provided to the baseband circuitry 704 for further processing. In some embodiments, the output baseband signals may be zero-frequency baseband signals, although this is not a requirement. In some embodiments, mixer circuitry 706a of the receive signal path may comprise passive mixers, although the scope of the embodiments is not limited in this respect.

In some embodiments, the mixer circuitry 706a of the transmit signal path may be configured to up-convert input baseband signals based on the synthesized frequency provided by the synthesizer circuitry 706d to generate RF output signals for the FEM circuitry 708. The baseband signals may be provided by the baseband circuitry 704 and may be filtered by filter circuitry 706c. The filter circuitry 706c may include a low-pass filter (LPF), although the scope of the embodiments is not limited in this respect.

In some embodiments, the mixer circuitry 706a of the receive signal path and the mixer circuitry 706a of the transmit signal path may include two or more mixers and may be arranged for quadrature downconversion and/or upconversion respectively. In some embodiments, the mixer circuitry 706a of the receive signal path and the mixer circuitry 706a of the transmit signal path may include two or more mixers and may be arranged for image rejection (e.g., Hartley image rejection). In some embodiments, the mixer circuitry 706a of the receive signal path and the mixer circuitry 706a may be arranged for direct downconversion and/or direct upconversion, respectively. In some embodiments, the mixer circuitry 706a of the receive signal path and the mixer circuitry 706a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 706 may include analog-to-digital converter (ADC) and digital-to-analog converter (DAC) circuitry and the baseband circuitry 704 may include a digital baseband interface to communicate with the RF circuitry 706.

In some dual-mode embodiments, a separate radio IC circuitry may be provided for processing signals for each spectrum, although the scope of the embodiments is not limited in this respect.

In some embodiments, the synthesizer circuitry 706d may be a fractional-N synthesizer or a fractional N/N+6 synthesizer, although the scope of the embodiments is not limited in this respect as other types of frequency synthesizers may be suitable. For example, synthesizer circuitry 706d may be a delta-sigma synthesizer, a frequency multiplier, or a synthesizer comprising a phase-locked loop with a frequency divider.

The synthesizer circuitry 706d may be configured to synthesize an output frequency for use by the mixer circuitry 706a of the RF circuitry 706 based on a frequency input and a divider control input. In some embodiments, the synthesizer circuitry 706d may be a fractional N/N+6 synthesizer.

In some embodiments, frequency input may be provided by a voltage-controlled oscillator (VCO), although that is not a requirement. Divider control input may be provided by either the baseband circuitry 704 or the applications processor 702 depending on the desired output frequency. In some embodiments, a divider control input (e.g., N) may be determined from a look-up table based on a channel indicated by the applications processor 702.

Synthesizer circuitry 706*d* of the RF circuitry 706 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+6 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 706*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 706 may include an IQ/polar converter.

FEM circuitry 708 may include a receive signal path which may include circuitry configured to operate on RF signals received from one or more antennas 760, amplify the received signals and provide the amplified versions of the received signals to the RF circuitry 706 for further processing. FEM circuitry 708 may also include a transmit signal path which may include circuitry configured to amplify signals for transmission provided by the RF circuitry 706 for transmission by one or more of the one or more antennas 760.

In some embodiments, the FEM circuitry 708 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 706). The transmit signal path of the FEM circuitry 708 may include a power amplifier (PA) to amplify input RF signals (e.g., provided by RF circuitry 706), and one or more filters to generate RF signals for subsequent transmission (e.g., by one or more of the one or more antennas 760.

In some embodiments, the electronic device 700 may include additional elements such as, for example, memory/storage, display, camera, sensors, and/or input/output (I/O) interface. In some embodiments, the electronic device of FIG. 7 may be configured to perform one or more methods, processes, and/or techniques such as those described herein.

A number of examples, relating to implementations of the techniques described above, will next be given. In a first example, a UE may comprise circuitry to: measure a first RSSI of a first cell of an LTE-LAA network, the UE being connected to the first cell, the UE being configured to measure the first RSSI outside of a transmission burst associated with the first cell; measure a second RSSI of a second cell of the LTE-LAA network, the UE not being connected to the second cell, the UE being configured to measure the second RSSI outside of a transmission burst associated with the second cell; and report the first and second RSSIs to the network.

In example 2, the UE, of example 1 or any of the examples described herein, may receive DRS configuration information from the first cell, wherein the measuring of the second RSSI, outside of the transmission burst associated with the second cell, is performed based on the received DRS configuration information.

In example 3, the DRS configuration information, of example 2 or any of the examples described herein, may indicate a particular periodicity and a particular duration, wherein the measuring of the second RSSI is further performed at the particular periodicity, and outside of the particular duration indicated in the DRS information.

In example 4, the UE, of examples 1, 2, or any of the examples described herein, may further measure a third RSSI of the first cell, wherein the measuring of the third RSSI includes measuring the third RSSI during the transmission burst of the first cell, wherein the UE further reports the third RSSI to the network.

In example 5, the UE, of example 4 or any of the examples described herein, may use the third RSSI measurement as a Reference Signal Receive Quality (RSRQ) measurement associated with the network.

In example 6, the UE of examples 1 or 2, or any of the examples described herein, may further measure a third RSSI of the second cell, wherein the measuring of the third RSSI includes measuring the third RSSI during the transmission burst of the second cell, wherein the UE further reports the third RSSI to the network.

In example 7, the UE of example 6 or any of the examples described herein, may use the third RSSI measurement as a RSRQ measurement associated with the second cell.

In example 8, the UE of example 1 or any of the examples described herein, may receive information, from the network, via an RRC message, indicating a transmission burst timing associated with the first cell, wherein the measuring of the first RSSI, outside of the transmission burst associated with the first cell, is performed based on the transmission burst timing indicated in the RRC message.

In example 9, the first cell, of any of examples 1-8 or any of the examples described herein, may be associated with an evolved NodeB that uses a licensed frequency.

In example 10, the second cell, of any of examples 1-8 or any of the examples described herein, may be associated with an LTE-LAA node that uses an unlicensed frequency.

In example 11, the UE, of any of examples 1-8 or any of the examples described herein, may comprise one or more antennas via which the UE communicates with the first and second cells.

In example 12, the UE, of any of examples 1-8 or any of the examples described herein, may comprise a non-transitory storage medium, wherein one or more of the operations are performed by one or more processors that execute one or more processor-executable instructions, stored by the non-transitory storage medium.

In a thirteenth example, an apparatus for an eNB may comprise circuitry to: output, to a UE connected to the eNB, timing information regarding transmission bursts associated with the eNB; receive, from the UE, first RSSI information, associated with the eNB, that has been measured by the UE outside of transmission bursts associated with the eNB; receive, from the UE, second RSSI information regarding a non-serving cell to which the UE is not connected; and perform cell selection, between the eNB and the non-serving cell, based on the received first and second RSSI information.

In example 14, the timing information, of example 13 or any of the examples described herein, outputted by the eNB to the UE, may be provided via a Radio Resource Control (RRC) message.

In example 15, the second RSSI information, of example 13 or any of the examples described herein, may have been measured by the UE outside of transmission bursts associated with the non-serving cell.

In example 16, the apparatus, of example 15 or any of the examples described herein, may further be configured to output DRS configuration information to the UE, the DRS configuration information indicating a period and duration of a DRS outputted by the non-serving cell, wherein the measuring of the second RSSI information outside of the transmission burst, by the UE, is performed based on the DRS configuration information.

In example 17, the apparatus, of example 13 or any of the examples described herein, may further be configured to receive third RSSI information associated with the eNB, the third RSSI information having been obtained during one or more transmissions bursts of the eNB, wherein the third RSSI is used as an RSRQ measurement of the eNB, wherein the cell selection is further performed based on the RSRQ of the eNB.

In example 18, the apparatus, of example 13 or any of the examples described herein, may further be configured to receive third RSSI information associated with the non-serving cell, the third RSSI information having been obtained during one or more transmissions bursts of the non-serving cell, wherein the third RSSI is used as a Reference Signal Receive Quality (RSRQ) measurement of the non-serving cell, wherein the cell selection is further performed based on the RSRQ of the non-serving cell.

In example 19, the non-serving cell, of any of examples 13-18 or any of the examples described herein, may be associated with an LTE-LAA node that uses an unlicensed frequency.

In example 20, the apparatus, of any of examples 13-18 or any of the examples described herein, may comprise one or more antennas via which the eNB communicates with the UE.

In a twenty-first example, one or more computer-readable media may have instructions that, when executed, cause a UE to: determine an RSSI of a non-serving cell, to which the UE is not connected, outside of a transmission burst associated with the non-serving cell; and provide the RSSI of the non-serving cell, measured outside of the transmission burst associated with the non-serving cell, to a serving cell, to which the UE is connected.

In example 22, the one or more computer-readable media, of example 21 or any of the examples described herein, may further comprise instructions that, when executed, cause the UE to: receive, from the serving cell, DRS configuration information, wherein the instructions, that cause the UE to determine the RSSI of the non-serving cell outside of the transmission burst associated with the non-serving cell, cause the UE to determine the RSSI of the non-serving cell at a time that is based on the DRS configuration information.

In example 23, the DRS configuration information, of example 22 or any of the examples described herein, may include a periodicity and a duration of a DRS outputted by the non-serving cell, wherein the instructions, that cause the UE to determine the RSSI of the non-serving cell outside of the transmission burst associated with the non-serving cell, cause the UE to determine the RSSI of the non-serving cell at the same periodicity of the DRS, and outside of the duration of the DRS.

In example 24, the one or more computer-readable media, of example 21 or any of the examples described herein, may further comprise instructions that, when executed, cause the UE to: determine a RSSI of a the serving cell, outside of a transmission burst associated with the serving cell; and provide the RSSI of the serving cell, measured outside of the transmission burst associated with the serving cell, to the serving cell.

In example 25, the one or more computer-readable media, of example 24 or any of the examples described herein, may further comprise instructions that, when executed, cause the UE to: receive, from the serving cell, RRC information that includes timing information associated with transmission bursts associated with the serving cell, wherein the instructions, that cause the UE to determine the RSSI of the serving cell outside of the transmission burst associated with the serving cell, cause the UE to determine the RSSI of the serving cell at a time that is based on the RRC configuration information.

In example 26, the RSSI, of example 21 or any of the examples described herein, may be a first RSSI, wherein the one or more computer-readable media further comprise instructions that, when executed, cause the UE to: measure a second RSSI during the transmission associated with the non-serving cell; and provide the second RSSI, as a Reference Signal Received Quality (RSRQ) value, to the serving cell.

In the preceding specification, various embodiments have been described with reference to the accompanying drawings. It will, however, be evident that various modifications and changes may be made thereto, and additional embodiments may be implemented, without departing from the broader scope of the subject matter as set forth in the claims that follow. The specification and drawings are accordingly to be regarded in an illustrative rather than restrictive sense.

For example, while series of signals have been described with regard to FIG. 2, the order of the signals may be modified in other implementations. Further, non-dependent signals may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions, of some embodiments, may be implemented as "logic" that performs one or more functions. This logic may include hardware, such as an application-specific integrated circuit ("ASIC") or a field programmable gate array ("FPGA"), or a combination of hardware and software.

Even though particular combinations of features are recited in the claims and/or disclosed in the specification, these combinations are not presented in a limiting sense. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used.

What is claimed is:

1. A user equipment (UE), comprising circuitry to:
    determine a first time period during which a transmission burst associated with a first cell of a Long-Term Evolution Licensed Assisted Access (LTE-LAA) network will occur, the UE being connected to the first cell, wherein each transmission burst comprises a downlink (DL) data signal;
    determine a second time period during which the transmission burst associated with the first cell will not occur based on the first time period;
    measure a first received signal strength indicator (RSSI) during the second time period;
    receive Discovery Reference Signal (DRS) configuration from the first cell, wherein the DRS configuration information indicates a particular periodicity and a particular duration for DRS associated with a second cell, the UE not being connected to the second cell;
    based on the DRS configuration, determine a third time period during which a transmission burst associated with the second cell of the LTE-LAA network will occur;
    determine a fourth time period during which the transmission burst associated with the second cell will not occur based on the third time period;
    measure a second RSSI during the fourth time period at the particular periodicity, such that the fourth time period is outside of the particular duration indicated in the DRS information; and
    report the first RSSI and second RSSI to the LTE-LAA network.

2. The UE of claim 1,
    wherein the UE further measures a third RSSI of the first cell during the first time period; and
    wherein the UE further reports the third RSSI to the LTE-LAA network.

3. The UE of claim 2, wherein the UE uses the third RSSI measurement as a Reference Signal Receive Quality (RSRQ) measurement associated with the LTE-LAA network.

4. The UE of claim 1,
    wherein the UE further measures a third RSSI of the second cell during the transmission burst of the second cell; and
    wherein the UE further reports the third RSSI to the LTE-LAA network.

5. The UE of claim 4, wherein the UE uses the third RSSI measurement as a Reference Signal Receive Quality (RSRQ) measurement associated with the second cell.

6. The UE of claim 1,
    wherein the UE receives information, from the LTE-LAA network, via a Radio Resource Control (RRC) message, indicating a transmission burst timing associated with the first cell,
    wherein the determining of the first time period is performed based on the transmission burst timing indicated in the RRC message.

7. An apparatus for an evolved NodeB (eNB), the apparatus comprising circuitry to:
    output, to a user equipment (UE) connected to the eNB, timing information regarding a first time period during which transmission bursts associated with the eNB will occur, wherein each transmission burst comprises a downlink (DL) data signal;
    output Discovery Reference Signal (DRS) configuration information to the UE, the DRS configuration information indicating a particular periodicity and a particular duration of a DRS outputted by a non-serving cell, the UE not being connected to the non-serving cell,
    receive, from the UE, first received signal strength indicator (RSSI) information, associated with the eNB, that has been measured by the UE during a second time period, wherein the UE determines the second time period based on the timing information about the first time period such that the second time period is outside of transmission bursts associated with the eNB;
    receive, from the UE, second RSSI information regarding the non-serving cell to which the UE is not connected, wherein the second RSSI is based on measurements made by the UE at the particular periodicity, such that the second RSSI is measured outside of the particular duration indicated in the DRS information and outside transmission bursts of the non-serving cell; and
    perform cell selection, between the eNB and the non-serving cell, based on the received first RSSI information and second RSSI information.

8. The apparatus of claim 7, wherein the timing information, outputted by the eNB to the UE, is provided via a Radio Resource Control (RRC) message.

9. The apparatus of claim 7, wherein the eNB is further configured to:
    receive third RSSI information associated with the eNB, the third RSSI information having been obtained during one or more transmissions bursts of the eNB,
    wherein the third RSSI information is used as a Reference Signal Receive Quality (RSRQ) measurement of the eNB,
    wherein the cell selection is further performed based on the RSRQ of the eNB.

10. The apparatus of claim 7, wherein the eNB is further configured to:
    receive third RSSI information associated with the non-serving cell, the third RSSI information having been obtained during one or more transmissions bursts of the non-serving cell,
    wherein the third RSSI information is used as a Reference Signal Receive Quality (RSRQ) measurement of the non-serving cell,
    wherein the cell selection is further performed based on the RSRQ of the non-serving cell.

11. One or more non-transitory computer-readable media having instructions that, when executed, cause a User Equipment (UE) to:
    receive Discovery Reference Signal (DRS) configuration from a serving cell, the UE being connected to the serving cell, wherein the DRS configuration information indicates a particular periodicity and a particular duration for DRS associated with a non-serving cell, the UE not being connected to the non-serving cell;

based on the DRS configuration, determine a first time period during which a transmission burst associated with the non-serving cell will occur, wherein each transmission burst comprises a downlink (DL) data signal;

determine a second time period during which the transmission burst associated with the non-serving cell will not occur based on the first time period;

measure a received signal strength indicator (RSSI) of the non-serving cell-during the second time period at the particular periodicity, such that the second time period is outside of the particular duration indicated in the DRS information;

determine a third time period during which a transmission burst associated with the serving cell, to which the UE is connected, will occur;

determine a fourth time period during which the transmission burst associated with the serving cell will not occur based on the third time period;

measure an RSSI of a serving cell during the fourth time period; and provide the RSSI of the serving cell, measured outside of the transmission burst associated with the serving cell, to the serving cell; and provide the RSSI of the non-serving cell to the serving cell to which the UE is connected.

12. The one or more non-transitory computer-readable media of claim 11, further comprising instructions that, when executed, cause the UE to:

receive, from the serving cell, Radio Resource Control (RRC) information that includes timing information associated with transmission bursts associated with the serving cell, wherein the instructions cause the UE to determine the fourth time period-based on the RRC configuration information.

13. The one or more non-transitory computer-readable media of claim 11, wherein the RSSI is a first RSSI, wherein the one or more computer-readable media further comprise instructions that, when executed, cause the UE to:

measure a second RSSI during the first time period; and provide the second RSSI, as a Reference Signal Received Quality (RSRQ) value, to the serving cell.

* * * * *